(12) United States Patent
Semeniuk

(10) Patent No.: US 8,299,894 B1
(45) Date of Patent: Oct. 30, 2012

(54) VEHICLE UNLOCKING SYSTEMS

(76) Inventor: John Semeniuk, Phoenix, AZ (US)

( * ) Notice: Subject to any disclaimer, the term of this patent is extended or adjusted under 35 U.S.C. 154(b) by 628 days.

(21) Appl. No.: 12/395,656

(22) Filed: Feb. 28, 2009

Related U.S. Application Data

(60) Provisional application No. 61/032,902, filed on Feb. 29, 2008, provisional application No. 61/075,677, filed on Jun. 25, 2008.

(51) Int. Cl.
*B60R 25/00* (2006.01)
(52) U.S. Cl. .................................. 340/5.72; 307/10.2
(58) Field of Classification Search ............. 340/5.72, 340/426.5, 426.1, 426.13, 426.36, 426.16, 340/426.17; 307/10.2, 10.5; 701/29, 32; 70/158–173, 227, 244, 256, 258; 180/287, 180/289
See application file for complete search history.

(56) References Cited

U.S. PATENT DOCUMENTS

| | | | |
|---|---|---|---|
| 6,434,459 B2 * | 8/2002 | Wong et al. ................... 701/36 |
| 6,798,336 B2 | 9/2004 | Kanda et al. |
| 6,885,738 B2 * | 4/2005 | White et al. ............. 379/102.06 |
| 7,027,781 B2 * | 4/2006 | Ko ............................ 455/92 |
| 7,136,709 B2 * | 11/2006 | Arling et al. .................. 700/65 |
| 7,228,122 B2 * | 6/2007 | Oyagi et al. ................. 455/411 |
| 7,363,129 B1 * | 4/2008 | Barnicle et al. ................. 701/1 |
| 7,471,187 B2 | 12/2008 | Nakashima et al. |
| 2005/0237152 A1 | 10/2005 | Nakashima et al. |
| 2006/0012462 A1 | 1/2006 | Teshima et al. |
| 2006/0028339 A1 | 2/2006 | Ogino et al. |
| 2006/0043181 A1 | 3/2006 | Naito et al. |
| 2006/0103240 A1 | 5/2006 | Naito et al. |
| 2007/0132553 A1 | 6/2007 | Nakashima |
| 2007/0152503 A1 * | 7/2007 | Kowalick .................... 307/10.1 |
| 2007/0229219 A1 | 10/2007 | Nakashima et al. |
| 2009/0115585 A1 * | 5/2009 | Minassian ............... 340/426.36 |

FOREIGN PATENT DOCUMENTS

| | | |
|---|---|---|
| JP | 2002-211361 A | 7/2002 |
| JP | 2003-115905 A | 4/2003 |
| JP | 2006-316431 A | 11/2006 |

OTHER PUBLICATIONS

Apogee Kits: E-Lock DTMF Touch Tone Combination Electronic Lock Kit E-Lock\MadLab user guide-2004, (pdf format) http://www.apogeekits.com/electronic_lock.htm.*

* cited by examiner

*Primary Examiner* — Daniel Wu
*Assistant Examiner* — Mancil Littlejohn
(74) *Attorney, Agent, or Firm* — Kevin Hazen

(57) ABSTRACT

A system relating to assisting persons locked out of their vehicle to unlock the vehicle. The system preferably uses a coded acoustic signal transmitted through a mobile phone to trigger a control device connected to the vehicle's onboard computer system. A microphone of the control device picks up the tone, which is subsequently processed by the system. If the acoustic signal is validated, the vehicle computer will be signaled to unlock a power-locked vehicle entry point. The system comprises security elements and easy-to-access phone assistance.

5 Claims, 8 Drawing Sheets

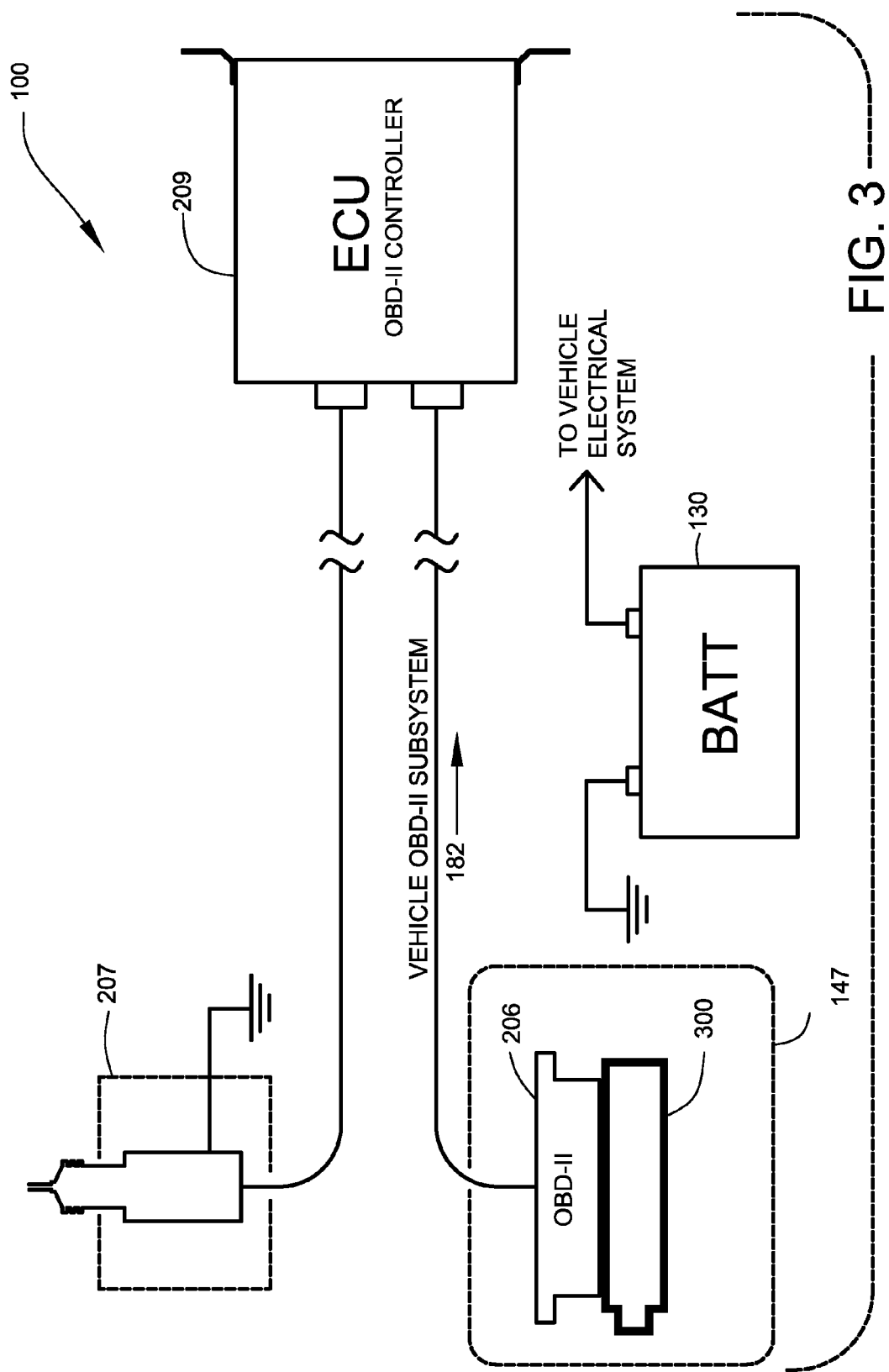

PRODUCT REGISTRATION

| Field | Value |
|---|---|
| First Name | John |
| Last Name | Smith |
| Home PH: | 555-212-1212 |
| Cell PH: | 555-212-5555 |
| E-mail address | john.smith@locassist.info |
| Set or Change P.I.N. | **** |
| Re-Enter new P.I.N. | **** |
| Vehicle Year | |
| Vehicle Make | |
| Vehicle Model | |

Address
City
State
Zip Code
Secret Question
Answer

DOWNLOAD NOW — 168

167

REGISTRATION | SUBSCRIPTION | SUPPORT/UPDATES

FAQ
SOFTWARE DOWNLOADS
ORDER A KIT
INSTALLATION
OEM INFO

FIG. 7

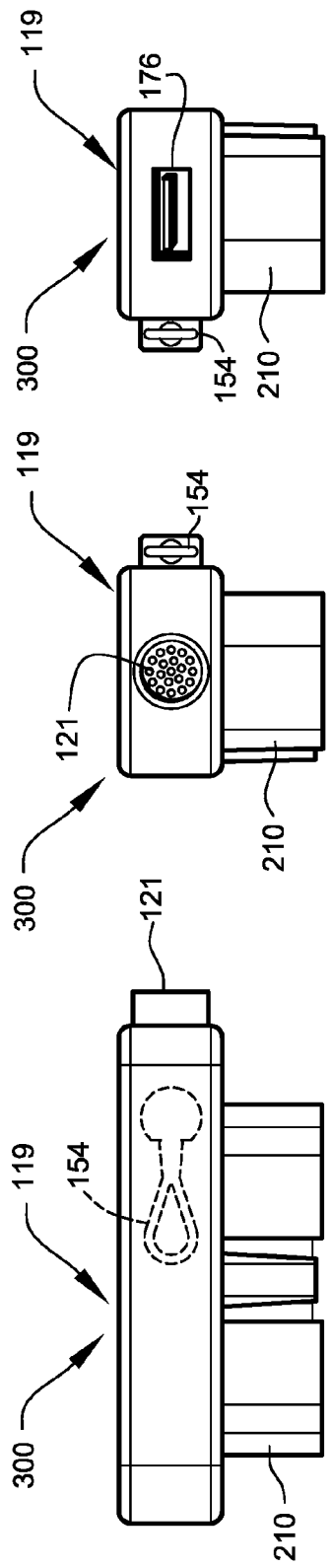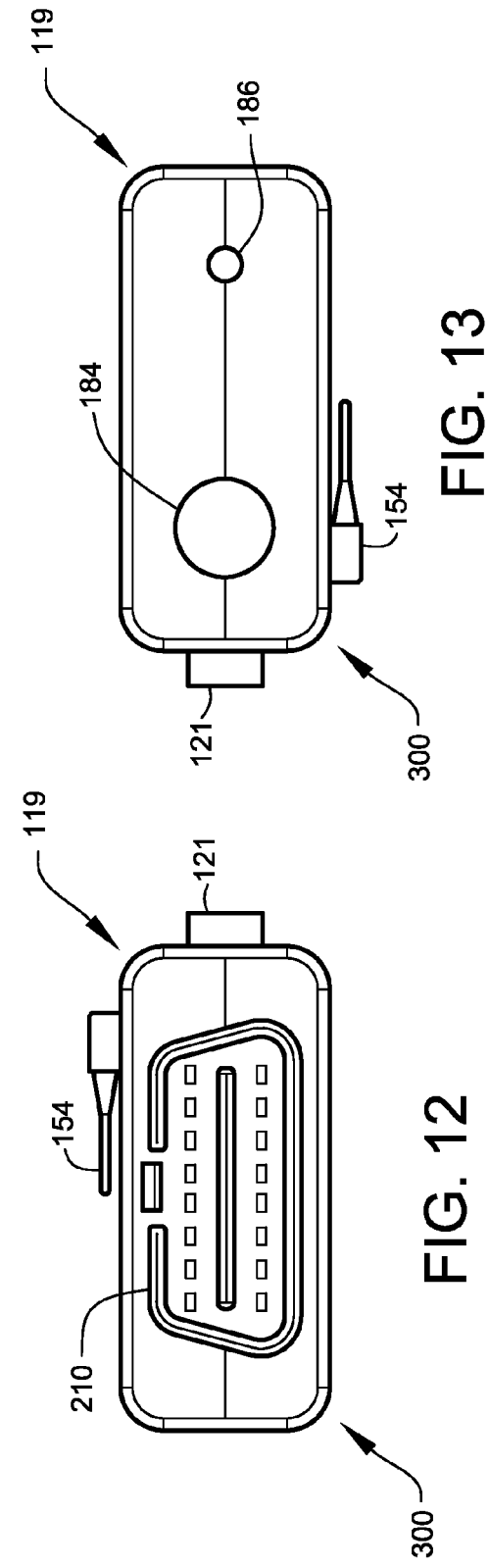

VEHICLE UNLOCKING SYSTEMS

CROSS-REFERENCE TO RELATED APPLICATION

The present application is related to and claims priority from prior provisional application Ser. No. 61/032,902, filed Feb. 29, 2008, entitled "VEHICLE UNLOCKING SYSTEMS", and is related to and claims priority from prior provisional application Ser. No. 61/075,677, filed Jun. 25, 2008, also entitled "VEHICLE UNLOCKING SYSTEMS", the contents of both of which are incorporated herein by this reference and are not admitted to be prior art with respect to the present invention by the mention in this cross-reference section.

BACKGROUND

This invention relates to vehicle unlocking systems. More particularly, this invention relates to providing a system for improved unlocking.

Most vehicle operators eventually experience the inconvenience, expense, and potential danger associated with locking their keys in their vehicle. Services to perform door onsite unlocking at the time the user needs to gain access to their vehicle may be unavailable, time-consuming, expensive, and/or cause damage to the vehicle. Furthermore, while waiting for help to arrive, an individual may be vulnerable to the hazards of climate, unscrupulous individuals, vermin, etc. A need clearly exists for a handy, efficient, and secure system to unlock vehicles in such situations.

OBJECTS AND FEATURES OF THE INVENTION

A primary object and feature of the present invention is to provide a system overcoming the above-mentioned problems.

It is a further object and feature of the present invention to provide such a system that will unlock almost any make and model of vehicle using almost any make and model of handheld mobile phone.

Another object and feature of the present invention is to provide such a system comprising at least one controller whereby a user may securely and efficiently open a locked door using an audible signal.

Another object and feature of the present invention is to provide such a system wherein an audible signal is dispatched to a user's communication device upon request by the user and authorization of that user.

A further object and feature of the present invention is to provide such a system comprising a monetizing method to provide rapid, cost-effective, and convenient service for dispatch of such door unlocking signal to a user of such services.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a control system, relating to unlocking entry to at least one vehicle having at least one digitally-controlled vehicle unlocking system, comprising: at least one digital controller adapted to digitally control such digitally-controlled vehicle unlocking system; and at least one housing structured and arranged to house such at least one digital controller; wherein such at least one housing comprises at least one attacher to attach such at least one housing to the at least one vehicle; and wherein such at least one digital controller comprises at least one coupler to digitally couple such at least one digital controller to the at least one digitally-controlled vehicle unlocking system; wherein such at least one digital controller comprises at least one computer structured and arranged to recognize at least one sequence of acoustic signals, generate at least one digital control signal on recognition of such at least one sequence of acoustic signals, and transmit such at least one digital control signal to the at least one digitally-controlled vehicle unlocking system using such at least one coupler; and wherein such at least one digital control signal is adapted to interact with the at least one digitally-controlled vehicle unlock system to assist unlocking of the at least one vehicle.

Moreover, it provides such a system wherein such at least one coupler comprises such at least one attacher. Additionally, it provides such a system wherein: such at least one computer is structured and arranged to recognize Dual-Tone Multi-Frequency tones; and such at least one sequence of acoustic signals comprises Dual-Tone Multi-Frequency tones. Also, it provides such a system wherein such at least one computer is structured and arranged to recognize acoustic signals generated by at least one handheld mobile phone.

In addition, it provides such a system wherein such at least one digital controller is structured and arranged to transmit such at least one digital control signal to the at least one digitally-controlled vehicle unlock system only upon receiving at least one specific coded series of acoustic signals. And, it provides such a system wherein such at least one computer comprises: at least one analog to digital converter structured and arranged to convert such at least one sequence of acoustic signals to at least one sequence of digital signals; at least one digital storage structured and arranged to digitally store at least one code sequence; and at least one processor structured and arranged to process the at least one sequence of digital signals and such at least one code sequence; wherein such at least one processor comprises at least one comparator structured and arranged to compare the at least one sequence of digital signals with such at least one code sequence to identify at least one matching correspondence, at least one signal generator structured and arranged to generate such at least one digital control signal on determining such at least one matching correspondence; and at least one transmitter structured and arranged to transmit such at least one digital control signal to the at least one digitally-controlled vehicle unlocking system. Further, it provides such a system wherein such wherein such at least one processor comprises at least one microcontroller comprising such at least one digital storage.

Even further, it provides such a system further comprising at least one user-data interface structured and arranged to assist user definition of such at least one code sequence. Moreover, it provides such a system wherein such at least one user-data interface comprises at least one standard serial interface implementing universal serial bus (USB) protocols. Additionally, it provides such a system wherein such at least one coupler comprises at least one physical format structured and arranged to be compatible with at least one on-board vehicle diagnostic port in communication with such digitally-controlled vehicle unlocking system of the at least one vehicle. Also, it provides such a system wherein such at least one coupler format is substantially compatible with at least one SAE-standard J1962 electrical connector. In addition, it provides such a system wherein such at least one digital controller derives substantially all operating power from the at least one vehicle.

In accordance with another preferred embodiment hereof, this invention provides a method, relating to assisting unlocking entry to at least one vehicle having at least one digitally-controlled vehicle unlocking system, comprising the steps of: providing at least one digital controller adapted to digitally control such digitally-controlled vehicle unlocking system, and at least one housing structured and arranged to house such at least one digital controller, wherein such at least one housing comprises at least one attacher to attach such at least one housing with the at least one vehicle, wherein such at least one digital controller comprises at least one coupler to digitally couple such at least one digital controller to the at least one digitally-controlled vehicle unlocking system, and wherein such at least one digital controller comprises at least one computer structured and arranged to recognize at least one sequence of acoustic signals, generate at least one digital control signal on recognition of such at least one sequence of acoustic signals, and transmit such at least one digital control signal to the at least one digitally-controlled vehicle unlocking system using such at least one coupler; and wherein such at least one digital control signal is adapted to interact with the at least one digitally-controlled vehicle unlock system to assist unlocking of the at least one vehicle; providing for user setting at least one specific coded series of acoustic signals to be so recognized; and providing at least one monetized service for at least one customer wishing remote assistance at times when such customers vehicle is locked and such customer does not have possession of the key; wherein such at least one monetized service comprises the steps of providing at least one call center reachable by at least one mobile phone by such at least one customer, and providing at least one method by which such at least one call center can verify the identity of such at least one customer, and upon such verifying, providing for signaling such at least one mobile phone in such manner that such at least one mobile phone emits such at least one specific coded series of acoustic signals; wherein such at least one customer is enabled to expose such locked vehicle to such at least one specific coded series of acoustic signals; and wherein such locked vehicle may be assisted to be unlocked.

Furthermore, it provides such a method wherein such at least one specific coded series of acoustic signals comprises at least a 4-digit alpha numeric code adapted to identify a specific digital controller. Further, it provides such a method further comprising the step of providing such at least one monetized service comprising a monthly service fee in exchange for such service.

In accordance with another preferred embodiment hereof, this invention provides a kit, relating to assisting unlocking entry to at least one vehicle having at least one digitally-controlled vehicle unlocking system, comprising: at least one digital controller adapted to digitally control such digitally-controlled vehicle unlocking system, wherein such at least one digital controller comprises at least one acoustic detector structured and arranged to detect at least one sequence of acoustic signals generated by at least one cell-phone, at least one control signal generator to generate at least digital control signal on detection of the at least one sequence of acoustic signals, at least one coupler to digitally couple such at least one digital controller to the at least one digitally-controlled vehicle unlocking system, at least one control-signal transmitter to transmit the at least digital control signal to the at least one digitally-controlled vehicle unlocking system, wherein such at least one digital control signal is adapted to interact with the at least one digitally-controlled vehicle unlock system to assist unlocking of the at least one vehicle; at least one set of instructions for installation and use of the kit components; The kit wherein such at least one set of instructions comprises at least one digital format.

Even further, it provides such a kit wherein such at least one set of instructions comprises at least one computer-hardware-executable program structured and arranged to assist user programming of such at least one digital controller with user-specific data. Even further, it provides such a kit further comprising at least one wallet-sized instruction card. In accordance with another preferred embodiment hereof, this invention provides a protection system, relating to protectively capping at least one onboard electronic diagnostic port of at least one vehicle having at least one onboard electronic diagnostic subsystem digitally coupled to at least one digitally-controlled vehicle unlocking system, comprising: at least one protective cap structured and arranged to protectively cap the at least one onboard electronic diagnostic port; wherein at least one protective cap comprises at least one digital controller adapted to digitally control such digitally-controlled vehicle unlocking system, and at least one attacher to attach such at least one protective cap to the at least one onboard electronic diagnostic port; wherein such at least one attacher comprises at least one coupler to digitally couple such at least one digital controller to the at least one onboard electronic diagnostic port; wherein such at least one digital controller comprises at least one computer structured and arranged to recognize at least one sequence of acoustic signals, generate at least one digital control signal on recognition of such at least one sequence of acoustic signals, and transmit such at least one digital control signal to the at least one digitally-controlled vehicle unlocking system using the at least one onboard electronic diagnostic port; and wherein such at least one digital control signal is adapted to interact with the at least one digitally-controlled vehicle unlock system to assist unlocking of the at least one vehicle. In accordance with another preferred embodiment hereof, this invention provides each and every novel feature, element, combination, step and/or method disclosed or suggested by this patent application.

BRIEF DESCRIPTION OF THE DRAWINGS

FIG. 3 shows a block diagram, generally illustrating preferred power and data pathways of the remote vehicle-unlocking unit, installed within a vehicle, according to the preferred embodiment of FIG. 1.

FIG. 7 shows a schematic depiction of an Internet website, according to a preferred method and embodiment of the present invention.

FIG. 9 shows a side view illustrating the preferred outer packaging arrangements of the remote vehicle-unlocking unit, according to the preferred embodiment of FIG. 1.

FIG. 10 shows a first end view illustrating the preferred outer packaging arrangements of the remote vehicle-unlocking unit of FIG. 1.

FIG. 11 shows a second end view illustrating the preferred outer packaging arrangements of the remote vehicle-unlocking unit of FIG. 1.

FIG. 12 shows a bottom view illustrating the preferred outer packaging arrangements of the remote vehicle-unlocking unit of FIG. 1.

FIG. 13 shows a top view illustrating the preferred outer packaging arrangements of the remote vehicle-unlocking unit of FIG. 1.

DETAILED DESCRIPTION OF THE BEST MODES AND PREFERRED EMBODIMENTS OF THE INVENTION

Figure 1:
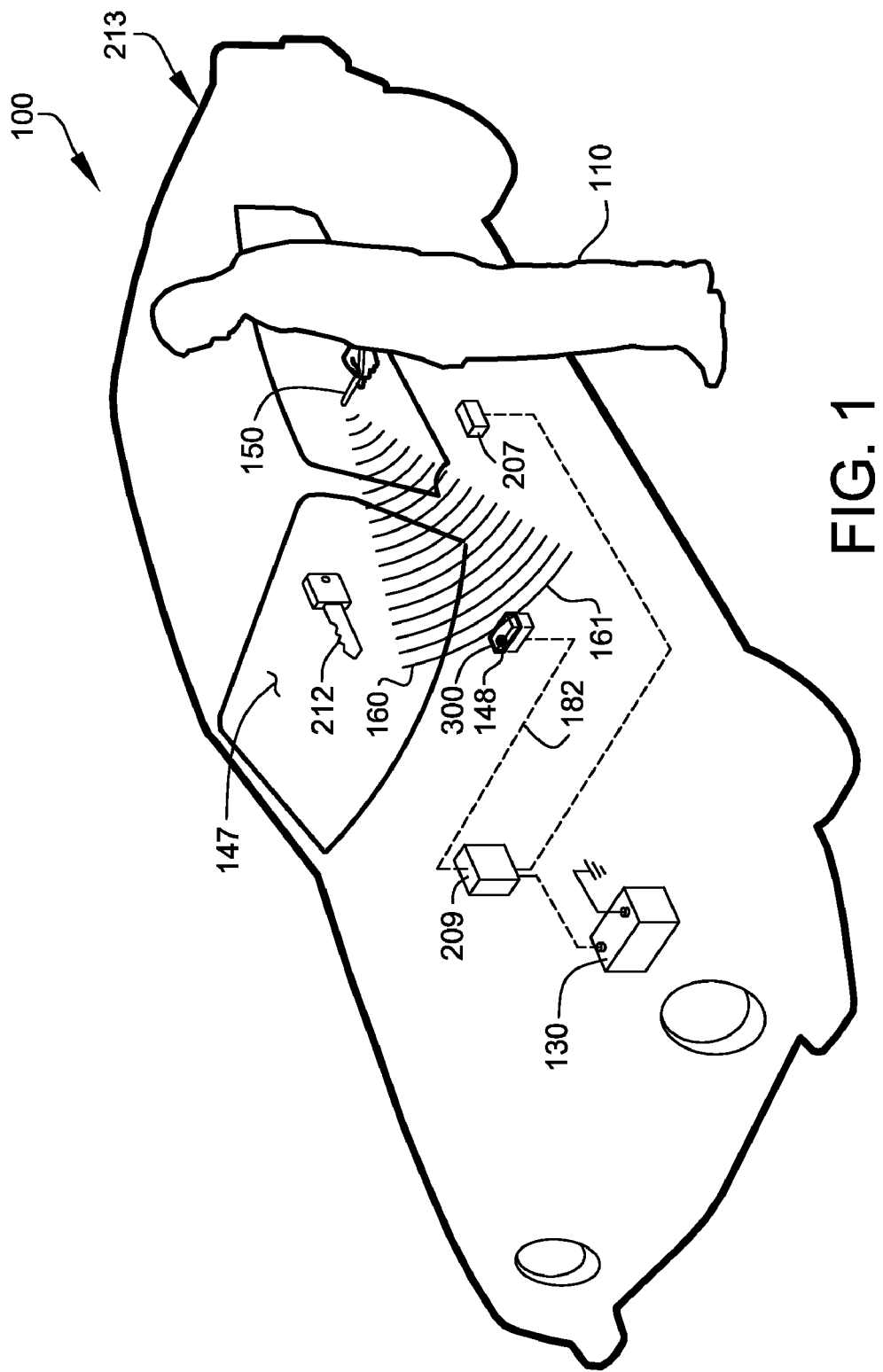
FIG. 1 shows a schematic diagram, illustrating a user initiating the operation of an onboard remote vehicle-unlocking unit to gain access to an inadvertently locked vehicle, according to a preferred method and embodiment of the present invention.

FIG. 1 shows a schematic diagram, illustrating user 110 initiating the operation of an onboard remote vehicle-unlocking unit 300 to gain access to an inadvertently locked vehicle 213, according to a preferred method and embodiment of the present invention. Vehicle 213 is shown preferably equipped with remote vehicle-unlocking unit 300, preferably located within passenger compartment 147, as shown. Remote vehicle-unlocking unit 300 is preferably adapted to unlock vehicle 213 by signaling the vehicle's onboard computer identified herein as the Electronic Control Unit (ECU 208), to activate the power-lock system 207.

Remote vehicle-unlocking unit 300 is preferably adapted to access ECU 209 via the On-Board Diagnostic (OBD) subsystem integrated within most currently-manufactured commercial automobiles, including vehicle 213. Remote vehicle-unlocking unit 300 is preferably adapted to interoperate with ECUs implementing standardized OBD II protocols. The OBD-II enabled ECU 209 functions to control and monitor the engine as well as other systems of vehicle 213, in particular power-lock system 207.

In the event that keys 212 are locked within vehicle 213, user 110 outside of the vehicle preferably configures phone mobile phone 150 to enable the external speaker of the device and positions the phone within a few inches of vehicle 213, preferably the vehicle window 155 nearest remote vehicle-unlocking unit 300. Preferably, using the keypad of mobile phone 150, user 110 enters a Personal Identification Number (PIN 148) corresponding to a matching PIN 148 that has been preprogrammed into remote vehicle-unlocking unit 300. Remote vehicle-unlocking unit 300 preferably acquires PIN 148 by acoustically detecting a corresponding sequence of audible coded-tones 161 generated by mobile phone 150. These audible coded-tones 161 preferably comprise Dual-Tone Multi-Frequency (DTMF) tones, also known as "touch tones", which are producible by most handheld mobile communication devices, preferably including mobile phone 150. If the sequence of audible coded-tones 161 generated by mobile phone 150 matches the preprogrammed sequence of tones stored within remote vehicle-unlocking unit 300, the unit generates an appropriate control signal that is passed to the OBD-II enabled ECU 209. On receiving the signal, ECU 209 unlocks vehicle 213 by activating power-lock system 207. Alternately preferably, user 110 initiates the operation of remote vehicle-unlocking unit 300 using mobile phone 150 in combination with assistance from a remote call center 145, as generally illustrated in the operational schematic of FIG. 2.

Figure 2:
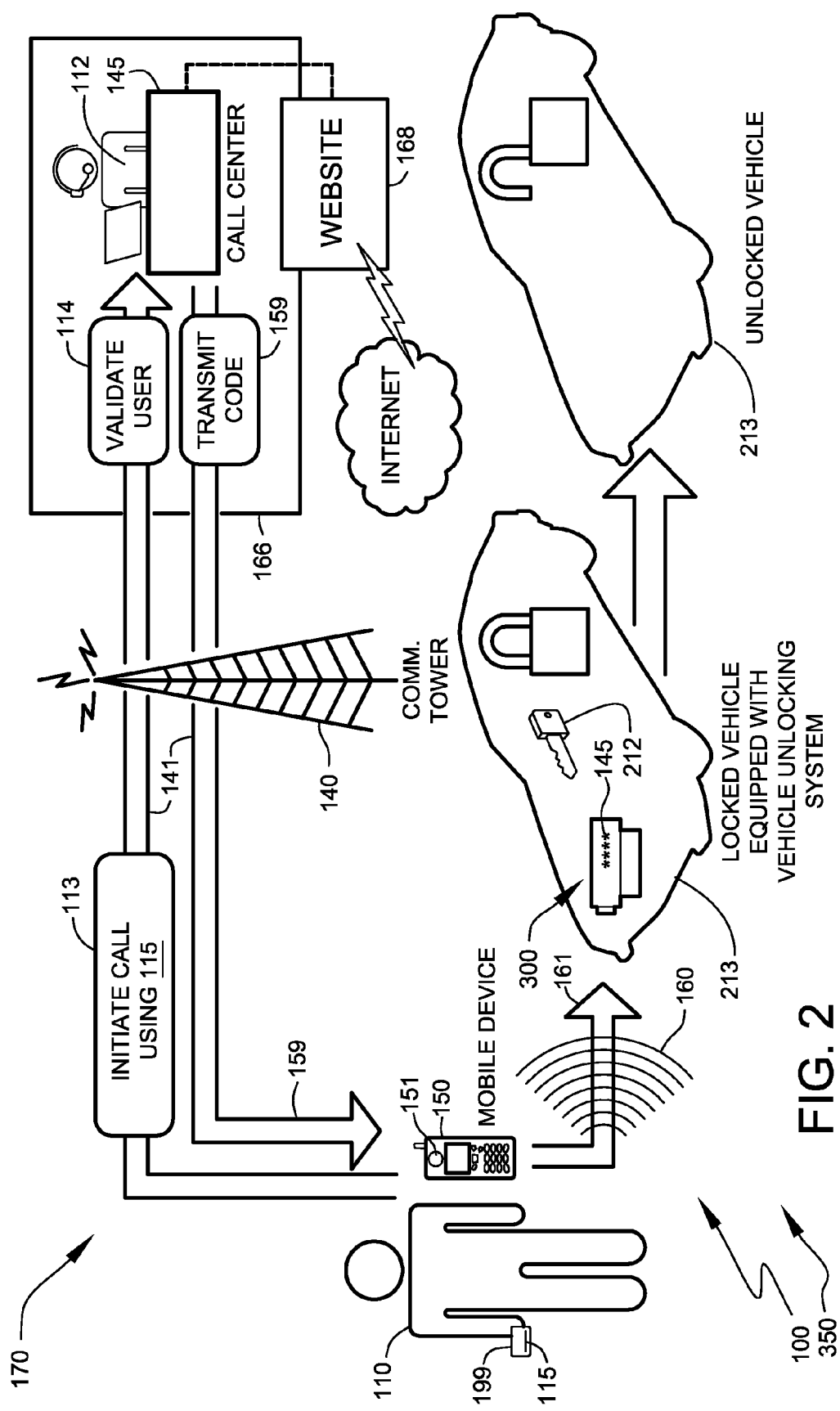
FIG. 2 shows an operational schematic, illustrating a preferred method of the vehicle unlocking system, wherein at least one remote call center is preferably established to initiate the operation of the remote vehicle-unlocking unit on behalf of user, according to another preferred method and embodiment of the present invention.

FIG. 2 shows the operational schematic 170, illustrating a preferred method 350 of vehicle unlocking system 100 wherein at least one remote call center 145 is preferably established to initiate the operation of remote vehicle-unlocking unit 300 on behalf of user 110. In the initial preferred step of method 350 user 110 creates a personal Identification Number (PIN 148), which is preferably recorded within remote vehicle-unlocking unit 300. The process of programming remote vehicle-unlocking unit 300 to contain PIN 148 is generally discussed in FIG. 14. Upon reading this specification, those with ordinary skill in the art will now appreciate that, under appropriate circumstances, considering such issues as cost, user preference, etc., other PIN arrangements such as, for example, embedding a permanent 6-digit pin code within the device, wherein the user registers the preset code in lieu of selecting a PIN, etc., may suffice.

Preferably, user 110 registers the selected PIN 148 with at least one service 166, as shown. Service 166 may preferably comprise an auto club, alternately preferably a rental car company, alternately preferably a fleet management company/department, alternately preferably a vehicle dealership, or alternately preferably a dedicated remote unlocking service. The registration transaction is preferably conducted by mail, alternately preferably by electronic facsimile (fax), alternately preferably by telephone, more preferably using at least one computer on-line service, most preferably at least one Internet website 168 accessible operated by service 166.

In general, most computer on-line services are currently accessed via the Internet. In basic terms, the Internet is a global network of computers. One popular component of the Internet is the World Wide Web, or the "Web". The World Wide Web contains computers that display graphical and textual information. Computers that provide information on the World Wide Web are typically called "Web sites." A Web site is defined by an Internet address that has an associated electronic page, often called a "web page". Generally, a web page is an electronic document that organizes the presentation of text, graphical images, audio and video into a desired display. The Internet website 168 of service 166, as depicted in FIG. 7, is such a web page preferably operating within the World Wide Web. Preferably, user 110 may access the Internet website 168 using special interface software, called "browser" software, installed within the end consumer's computer, mobile phone, or other access device.

Internet website 168 preferably comprises at least one browser-based customer interface 167 allowing pertinent data to be entered by user 110, as generally illustrated in FIG. 7. In a preferred implementation of the present invention, browser-based customer interface 167 preferably utilizes one or more Rich Ajax Platform (RAP) applications (see URL http://www.eclipse.org/rap/). Pertinent user data entered on Internet website 168 is preferably made available to call center 145, preferably including the user's unique identifier, preferably comprising the user-selected PIN 148.

In the event that keys 212 are locked within vehicle 213, user 110 outside of the vehicle preferably initiates a distress call 113 by contacting call center 145 using mobile phone 150. User 110 preferably dials a system-provided toll-free emergency number 115 to place the distress call 113 at a remote call center 145 operated by service 166, as shown.

Mobile phone 150 preferably sends a radio signal through a wireless connection to network 141. In a preferred arrangement of the present system, network 141 comprises a distribution of cellular sites, which interconnect to a public switched telephone network herein after referred to as "PSTN". Mobile phone 150 preferably comprises a low-power transceiver that preferably transmits data to the nearest cell site or similar communication node. If mobile phone 150 comprises a cellular phone, mobile phone 150 periodically registers its unique identifiers with the mobile telephone exchange, or switch during operation. The wireless distress call 113 is preferably received and transferred by a network node 140 (such as a radio-communication tower) to PSTN.

Distress call 113 is preferably received at call-center 145 by at least one call-center operator 112, as shown. On receiving distress call 113, call-center operator 112 preferably verifies the identity of user 110, preferably via at least one pre-determined password 114. It is noted that the pre-determined password 114 may preferably comprise PIN 148 or other unique identifier that has been registered with service 166. This preferred step maintains a level of security sufficient to protect user 110 against fraud and misrepresentation by anyone not having password 114 and attempting to obtain access to locked vehicle 213.

Once the identity of user 110 is verified, the call-center operator 112 preferably instructs the locked-out user 110 to enable the external speaker of mobile phone 150 and to position the phone within a few inches of vehicle 213, most preferably near the vehicle window 155 nearest remote vehicle-unlocking unit 300, as shown in FIG. 1. Call-center operator 112 preferably sends at least one digital signal 159 to mobile phone 150, preferably utilizing communications network 141. Digital signal 159 is preferably received by the user's chosen mobile phone 150. Preferably, when digital signal 159 is received by mobile phone 150, it is preferably converted by mobile phone 150 to a corresponding sequence of audible DTMF acoustic signals detectable by remote vehicle-unlocking unit 300. The DTMF acoustic signal preferably comprises a sequence of audible coded-tones 161, preferably a four-digit alpha numeric code corresponding to that specific user 110, vehicle 213, and preprogrammed code sequence stored within remote vehicle-unlocking unit 300. If the sequence of audible coded-tones 161 generated by mobile phone 150 match the code sequence stored within remote vehicle-unlocking unit 300, the unit preferably produces at least one control signal that directs the OBD-II enabled ECU 209 to unlock vehicle 213 by activating power-lock system 207. Thus, upon sounding the unique tone sequence, the vehicle will preferably "unlock". Upon successful unlocking of the door on vehicle 213, user 110 preferably sends verification to call-center 145, preferably via mobile phone 150 to establish that the desired unlocking procedure 109 was accomplished.

Upon reading this specification, those with ordinary skill in the art will now appreciate that, under appropriate circumstances, considering such issues as design preference, user preferences, marketing preferences, cost, structural requirements, available materials, technological advances, etc., other uses for the unlocking system such as, for example, used to open residential house locks, commercial locks, safes, etc., may suffice.

Preferably, access to call center 145 is made available as a monthly service sold to user 110 of vehicle 213 or other qualified users of the vehicle unlocking system 100 (at least embodying herein providing such at least one monetized service comprising a monthly service fee in exchange for such service). Upon reading this specification, those with ordinary skill in the art will now appreciate that, under appropriate circumstances, considering such issues as handheld mobile device preference, user preferences, marketing preferences, cost, network requirements, technological advances, etc., other system arrangements such as, for example, the use of other signals that can be used to generate audible sound, the use of other data networks capable of contacting a user's mobile device, automating portions of the call-center process, automating call-center operator, providing "call-center" access in the form of a website for web-accessible mobile devices, etc., may suffice. Further, upon reading this specification, those with ordinary skill in the art will now appreciate that, under appropriate circumstances, considering such issues as design preference, user preferences, marketing preferences, cost, structural requirements, available materials, technological advances, etc., other personal communication devices such as, for example, personal digital assistants (PDAs), pagers, portable computers, web-enabled handheld devices, etc., may suffice.

Figure 5:
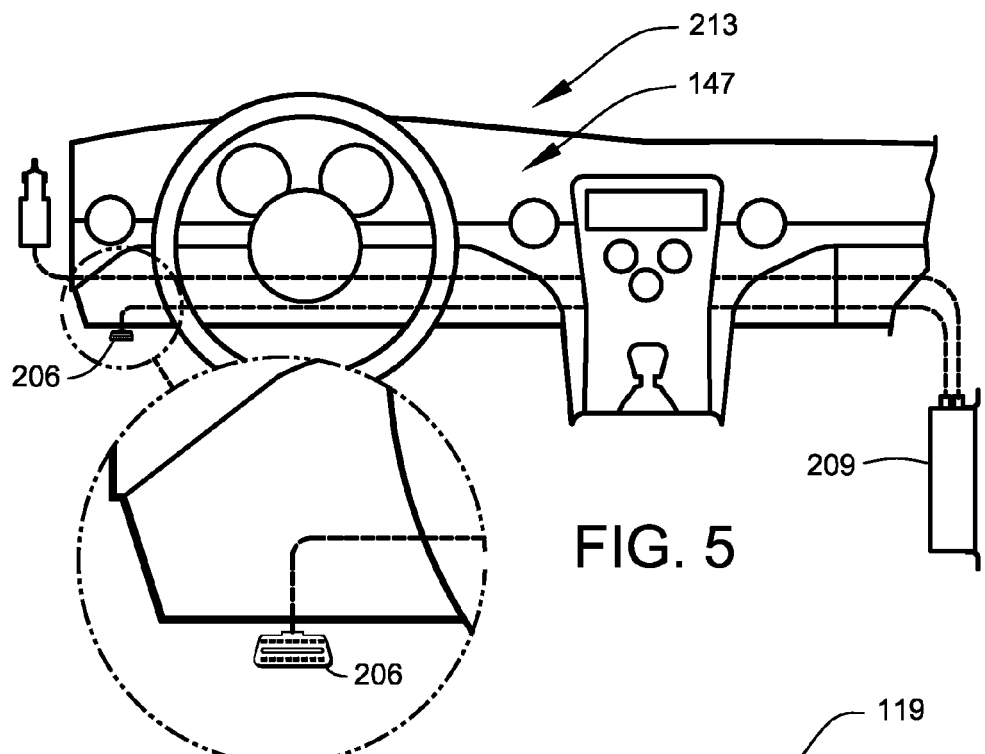
FIG. 5 shows an elevation view of a Diagnostic Link Connector (DLC), located within passenger compartment of the vehicle, according to the preferred embodiment of FIG. 1.
Figure 4:
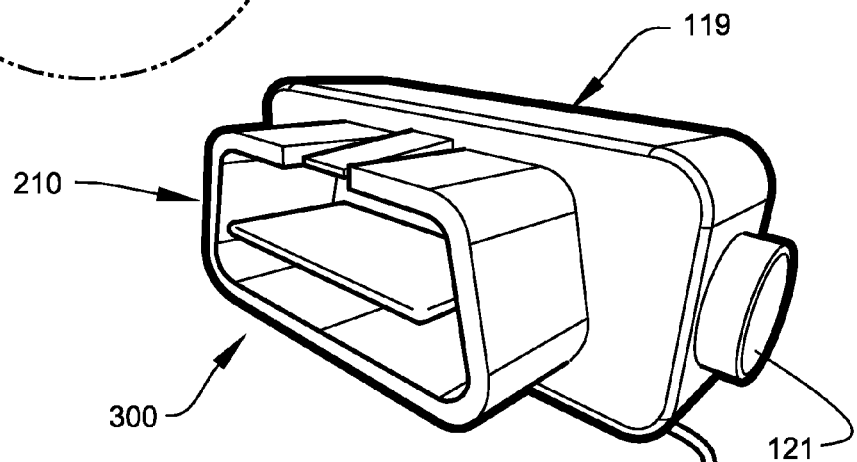
FIG. 4 shows a perspective view of a preferred outer package of the remote vehicle-unlocking unit, according to the preferred embodiment of FIG. 1.
Figure 6:
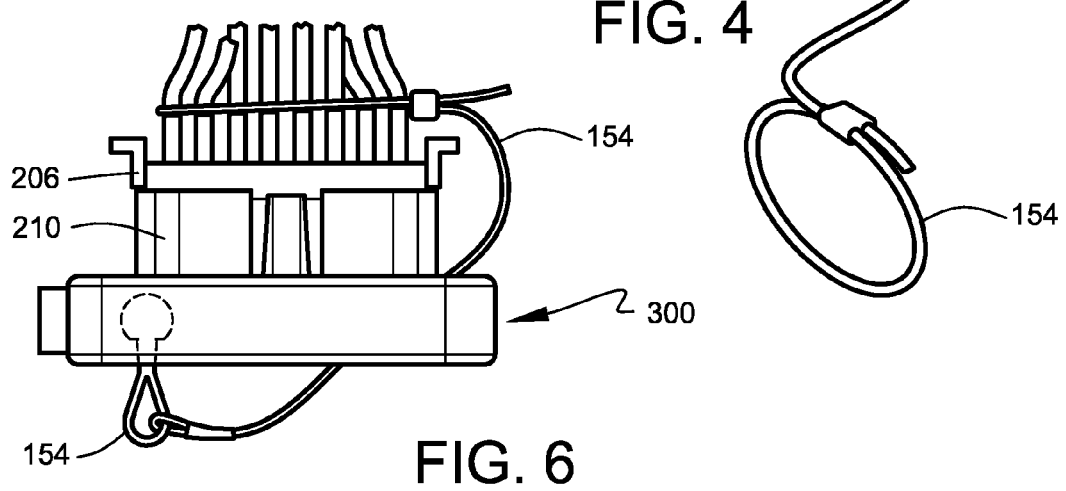
FIG. 6 shows a plan view of the remote vehicle-unlocking unit, coupled to the DLC, according to the preferred embodiment of FIG. 1.

FIG. 3 shows a block diagram, generally illustrating preferred power and data pathways of a remote vehicle-unlocking unit 300 installed within vehicle 213, according to the preferred embodiment of FIG. 1. FIG. 4 shows a perspective view of a preferred outer package of remote vehicle-unlocking unit 300. FIG. 5 shows an elevation view of Diagnostic Link Connector (DLC 206) located within passenger compartment 147 of vehicle 213, according to a preferred installation environment of the preferred embodiment of FIG. 1. FIG. 6 shows a plan view of remote vehicle-unlocking unit 300 coupled to DLC 206, according to the preferred embodiment of FIG. 1.

Remote vehicle-unlocking unit 300 preferably accesses ECU 209 via Diagnostic Link Connector (DLC 206) located within the passenger compartment 147 of vehicle 213, as shown. DLC 206 is a physical extension of the On-Board Diagnostic (OBD) subsystem installed within most currently-manufactured commercial automobiles, preferably including vehicle 213. DLC 206 also comprises a source of vehicle-supplied electrical power preferably used to power remote vehicle-unlocking unit 300.

As noted above, remote vehicle-unlocking unit 300 is preferably adapted to interoperate with ECUs implementing a least one standardized diagnostic protocol, most preferably OBD-II protocols. The OBD-II enabled ECU 209 functions to control and monitor the engine as well as other systems of vehicle 213, in particular power-lock system 207. In most vehicles, the unlock process is preferably initiated using the standardized bi-directional communication capabilities established between DLC 206 and the OBD-II enabled ECU 209.

The outer housing 119 of remote vehicle-unlocking unit 300 preferably comprises electrical coupler 210, as shown. Electrical coupler 210 preferably comprises an OBD-II compatible coupler, more preferably a 16-pin J1962-type coupler compatible with the J1962-type DLC 206, as standardized by the Society of Automotive Engineers (SAE). The preferred use of the vehicle OBD-II DLC 206 (at least embodying herein at least one coupler to digitally couple such at least one digital controller to the at least one digitally-controlled vehicle unlocking system) as an access point provides a preferred standard interface with which to digitally couple remote vehicle-unlocking unit 300 and draw operating power from vehicle 213. The preferred functional and physical alignment of the system with current OBD-II protocols allows for standardized installation of remote vehicle-unlocking unit 300 across substantially all current vehicle platforms. In addition, the preferred use of a standardized "cross-platform" connector 210 allows outer housing 119 to comprise a single manufactured model.

As DLC 206 preferably comprises the only required attacher for remote vehicle-unlocking unit 300, the installation of remote vehicle-unlocking unit 300 requires essentially no tools or modifications to the vehicle. Preferred installation of the unit comprises a "snap-together" engagement of coupler 210 to DLC 206 (at least embodying herein wherein such at least one housing comprises at least one attacher to attach such at least one housing to the at least one vehicle; and at least embodying herein wherein such at least one coupler comprises such at least one attacher). When so engaged, remote vehicle-unlocking unit 300 is electrically coupled to ECU 209, is preferably supported entirely by DLC 206, and preferably functions to protectively cap DLC 206 (at least embodying herein at least one protective cap structured and arranged to protectively cap the at least one onboard electronic diagnostic port).

Outer housing 119 of remote vehicle-unlocking unit 300 preferably includes at least one flexible tether 154 that is preferably used to further secure remote vehicle-unlocking unit 300 to DLC 206 or other closely-positioned structure. Tether 154 preferably functions to provide a convenient means for retaining remote vehicle-unlocking unit 300 near DLC 206, only when the unit is temporarily removed from DLC 206, as during vehicle diagnostic testing. Upon reading this specification, those with ordinary skill in the art will now appreciate that, under appropriate circumstances, considering such issues as cost, user preference, etc., other arrangements such as, for example, providing a "pass-through" arrangement wherein both male and female couplers are provided to allow external diagnostics equipment access the diagnostic port without removing the unit, etc., may suffice.

Figure 8:
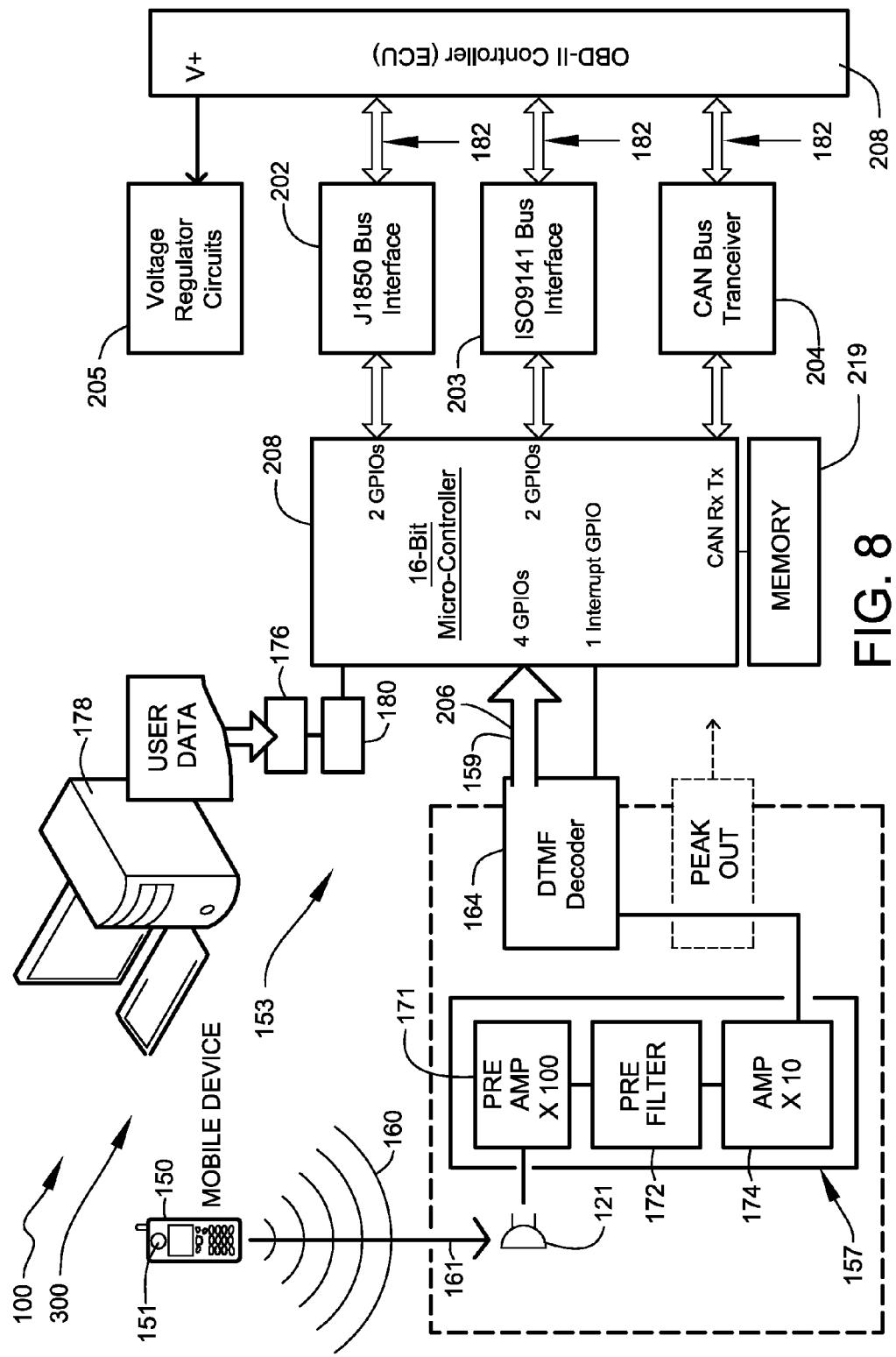
FIG. 8 shows a block diagram, illustrating the preferred functional arrangements of a control circuit of the remote vehicle-unlocking unit, according to the preferred embodiment of FIG. 1.

FIG. 8 shows a block diagram, illustrating the preferred functional arrangements of a control circuit 153 of remote vehicle-unlocking unit 300, according to the preferred embodiment of FIG. 1. Control circuit 153 preferably comprises a microprocessor-based architecture preferably utilizing at least one onboard microcontroller 208, as shown.

Control circuit 153 preferably comprises at least one onboard microphone 121 that is preferably used to detect audible DTMF coded-tones 161 generated by speaker 151 of mobile phone 150, as shown. Microphone 121 is preferably positioned within outer housing 119 adjacent at least one sound-passing aperture formed within the housing, as best shown in FIG. 10. Microphone 121 preferably functions as an acoustic-to-electric transducer that preferably converts the sound wave 160, preferably comprising the analog DTMF coded-tones 161, into a modulated (analog) electrical signal.

The low-level analog signal generated from microphone 121 is preferably processed through filter/amplifier section 157, as shown. Filter/amplifier section 157 preferably comprises pre-amplifier 171 followed by a DTMF pre-filter 172, as shown. Pre-amplifier 171 preferably comprises at least one high-gain operational amplifier (op amp) circuit preferably comprising a gain of about 100. Pre-filter 172 preferably comprises an 8th order Butterworth band-pass filter having a gain of about 10, a cut-off frequency (fc) of about 1225 Hz, a pass bandwidth (BW) of about 1300 Hz, and a stop BW of about 2300 Hz. Band-pass filter preferably uses switched capacitor techniques high and low group filters within the preferred embodiment of the present invention. A preferred pre-filter 172 may be developed using LTC1068 Series integrated circuits produced by Linear technology of Milpitas, Calif. Upon reading this specification, those with ordinary skill in the art will now appreciate that, under appropriate circumstances, considering such issues as design preference, user preferences, marketing preferences, cost, structural requirements, available materials, technological advances, etc., other filter arrangements such as, for example, other available power source amounts, with or without internal gain setting, other capacitor types, other filters, etc., may suffice.

The signal output from pre-filter 172 is preferably passed through a second amplifier 174 before being processed by DTMF decoder 164, as shown. Amplifier 174 preferably comprises at least one op-amp circuit preferably comprising a gain of about 10. An audio peak level detector may preferably be placed sequel to amplifier 174 to pass peak levels signal values to other circuit components.

DTMF decoder 164 preferably decodes the incoming analog DTMF-tone signal to produce digital signal 159 that is preferably passed to onboard microcontroller 208 as serial decoded data output (at least embodying herein at least one analog to digital converter structured and arranged to convert such at least one sequence of acoustic signals to at least one sequence of digital signals). DTMF decoder 164 preferably uses digital counting techniques to detect and decode all 16 DTMF tone-pairs into 4-bit binary code. A preferred DTMF decoder 164 comprises at least one circuit based on a wide dynamic range (about 50 dB) DTMF receiver, preferably a series ZL49021DAA IC (available through ZARLINK™ Semiconductor Inc.). At least one external asynchronous binary counter is used to monitor the oscillator output pin of the chip. Upon reading this specification, those with ordinary skill in the art will now appreciate that, under appropriate circumstances, considering such issues as design preference, user preferences, marketing preferences, cost, structural requirements, available materials, technological advances, etc., other power arrangements such as, for example, other power requirement DTMFs, other counting techniques, etc., may suffice.

The onboard microcontroller 208 of control circuit 153 preferably comprises a general purpose 16-bit device, preferably comprising in-system (integrated) programmable memory. It noted that the preferred processes of microcontroller 208 many preferably be divided between two or more onboard microcontrollers. This preferred arrangement may preferably comprise the use of a CAN-enabled microcontroller situate between the between the OBD-II interface circuits and a primary microcontroller. Preferred microcontroller(s) suitable for use as microcontroller 208 preferably include microcontroller part PIC18F2580 produced by Microchip Technology Inc. of Chandler, Ariz., and microcontroller part ATmega644 produced by Atmel Corporation of Colorado Springs, Colo.

The preferred operation of remote vehicle-unlocking unit 300 is preferably implemented by executing one or more programs digitally stored within memory 219 of microcontroller 208. Preferably, microcontroller 208 contains a central processing unit (CPU) and associated circuitry, the above-noted memory 219 (at least embodying herein at least one digital storage structured and arranged to digitally store at least one code sequence), and a variety of input/output (I/O) ports providing both microcontroller-to-user and microcontroller-to-vehicle interfaces. The executable programs of vehicle unlocking system 100 are preferably executed by microcontroller 208 to enable the preferred methods and processes described herein. Preferably, when microcontroller 208 executes such a program, it becomes a special-purpose device and thus an integral portion of vehicle unlocking system 100.

Control circuit 153 preferably comprises at least one external user data port 176 usable to access externally the on-board memory of microcontroller 208. User data port 176 preferably comprises at least one standard serial interface, most preferably a single serial port implementing universal serial bus (USB) protocols. User data port 176 is preferably structured and arranged to allow user 110 to program microcontroller 208 by downloading from a remote computer 178 the user's selected PIN 148 and ECU 209 unlock code for the user's specific vehicle 213. Although microcontroller 208 may preferably comprises a dedicated serial peripheral interface (SPI header) for programming, user data port 176 is preferably adapted to allow updating of the operating programs/firmware, as required. User data port 176 is preferably implemented using a single-chip USB to asynchronous serial data bus (UART) bridge controller 180, such as, for example, the preferred model CP2102 chip produced by Silicon Labs of Austin, Tex. USB to UART bridge controller 180 is preferably coupled to a standard type-B USB coupler and one or more peripheral pins of microcontroller 208.

Microcontroller 208 is preferably maintained in a "low-power" mode and preferably, intermittently, "wakes up" to determine if an appropriate "initiating" digital signal as been received. More preferably, microcontroller 208 is maintained in a "low-power" mode and preferably "wakes up" when an appropriate "initiating" digital signal as been received. Microcontroller is preferably programmed to, upon receipt of specific digital signals; remain in an "on" state to receive further digital signals. Once the "initiating" digital signal is received, the input/output state of the device preferably changes and additional logic programming within microcontroller 208 is preferably executed.

Remote vehicle-unlocking unit 300 preferably comprises at least one status indicator 186 to alert user 110 as to the operational status of the unit. Status indicator 186 preferably comprises at least one light emitting diode (LED), preferably located at a visibly accessible position on or within the outer housing 119 (see FIG. 13). Remote vehicle-unlocking unit 300 preferably comprises at least one test/reset button 184, also preferably located in an accessible position within the outer housing 119. Both test/reset button 184 and status indicator 186 are functionally coupled to I/O registers of the microcontroller(s).

The preferred control logic of microcontroller 208 comprises one or more assembled programs stored in system memory and executed within the microcontroller. On startup, the control logic of microcontroller 208 initiates a flashing alert sequence, at status indicator 186, preferably designed to alert user 110 to the fact that the unit is on and operating properly. Those skilled in the art will appreciate that the control logic may preferably execute additional necessary instructions to initialize the ports and peripherals of the micro-controller, run self diagnostics, etc. After initialization, status indicator 186 is preferably maintained in a continuously illuminated state to indicate that remote vehicle-unlocking unit 300 is operational.

Microcontroller 208 is preferably programmed to flash status indicator 186 each time a digital signal 159 associated with a discernable DTMF tone has been received. Microcontroller 208 is preferably programmed to compare digital signal 159 with the pre-programmed code values, stored in the system memory, to determine if a "match" exists. In other words, the control logic preferably compares each of the DTMF tones received against the pre-program user code sequence downloaded to microcontroller 208 by user 110 (or other entity on the user's behalf). If a correct match is made, microcontroller 208 (at least embodying herein at least one comparator structured and arranged to compare the at least one sequence of digital signals with such at least one code sequence to identify at least one matching correspondence) is preferably programmed to generate an appropriate unlock code for the user's specific vehicle 213 (at least embodying herein at least one signal generator structured and arranged to generate such at least one digital control signal). The digital unlock control signal 182 (at least embodying herein at least one digital control signal) is preferably output to DLC 206 via at least one of compatible data-bus interfaces of control circuit 153. Upon reading this specification, those with ordinary skill in the art will now appreciate that, under appropriate circumstances, considering such issues as design preference, user preferences, marketing preferences, cost, structural requirements, available materials, technological advances, etc., other controller arrangements such as, for example, other onboard computer configurations, remote computers, wireless controllers, etc., may suffice. It is noted that unlock control signal 182 preferably matches the vehicle-specific code specified by the vehicle's manufacturer (OEM).

Preferred operational programming of microcontroller 208 preferably comprises security logic intended to prevent unauthorized vehicle entry by limiting the number unsuccessful code entries to a preset maximum. Remote vehicle-unlocking unit 300 is preferably programmed to allow about 21 unsuccessful four-digit code entries before preferably entering a deactivated state, wherein any additional acoustic tones directed to the unit are ignored. Microcontroller 208 is preferably programmed to continuously flash status indicator 186 to indicate that deactivation has occurred. To reactivate remote vehicle-unlocking unit 300, user 110 must physically access test/reset button 184. This prevents unscrupulous individuals from attempting to defeat the system by randomly generating DTMF tones.

Microcontroller 208 is preferably structured and arranged to function with a majority of the OBD-II communication protocols used by current vehicle manufacturers. Microcontroller 208 preferably comprises sufficient control logic as to enable communication with the specific bus interface used by the OBD subsystem of vehicle 213.

Current OBD-II standards allow vehicle manufacturers to use one of several bus interfaces to communicate with ECU 208, or similar body-controller computers. Microcontroller 208 preferably comprises at least four general purpose input/output data busses, hereinafter referred to as "GPIO(s)" and at least one interrupt GPIO data bus interoperating with DTMF Decoder 164, as shown. Onboard microcontroller 208 preferably comprises at least two (2) GPIO data busses enabling communication through ISO9141 Bus interface 203, at least two (2) GPIO data busses enabling communication through J1850 Bus interface 202, and a CAN Rx Tx connection supporting CAN Bus transceiver 204, as shown. "CAN" is the acronym used for Controller Area Network, which is a government mandated standard bus interface that must be installed on all domestic (US) vehicles as of 2008 for emission testing purposes. CAN Bus transceiver 204 may preferably utilize at least one high-speed CAN transceiver chip part MCP2551 produced by Microchip Technology Inc. of Chandler, Ariz.

ISO9141 Bus interface 203 is preferably used for compatibility with 8-Volt OEM import body lock controllers. J1850 Bus interface 202 is used for compatibility with OEM domestic products made by General Motors and Ford. J1850 Bus interface 202 uses two protocols for signal translation, pulse width modulation and variable pulse width. Upon reading this specification, those with ordinary skill in the art will now appreciate that, under appropriate circumstances, considering such issues as design preference, user preferences, marketing preferences, cost, structural requirements, available materials, technological advances, etc., other body lock controllers may suffice. Further, upon reading this specification, those with ordinary skill in the art will now appreciate that, under appropriate circumstances, considering such issues as design preference, user preferences, marketing preferences, cost, structural requirements, available materials, technological advances, etc., other GPIO bus configurations may suffice.

GPIO busses provide dedicated general-purpose pins that can be configured as either inputs or as outputs permitting two-way flow of data. When GPIO bus is configured as an output, it can write to an internal register to control the state driven on the output pin. When GPIO is configured as an input, it can detect the state of the input by reading the state of an internal register. GPIO peripheral can also preferably produce CPU interrupts and enhanced Direct Memory Access events in different interrupt/event generation modes.

Preferably, once unlock control signal 182 has been translated through the applicable bus interface or transceiver and transmitted by control circuit 153 (at least embodying herein at least one transmitter) to the OBD-II enabled ECU 208, ECU 209 activates power-lock system 207 to unlock vehicle 213 (at least embodying herein wherein such at least one digital controller comprises at least one computer structured and arranged to recognize at least one sequence of acoustic signals, generate at least one digital control signal on recognition of such at least one sequence of acoustic signals, and transmit such at least one digital control signal to the at least one digitally-controlled vehicle unlocking system using such at least one coupler; and wherein such at least one digital control signal is adapted to interact with the at least one digitally-controlled vehicle unlock system to assist unlocking of the at least one vehicle). Upon reading this specification, those with ordinary skill in the art will now appreciate that, under appropriate circumstances, considering such issues as design preference, user preferences, marketing preferences, cost, structural requirements, available materials, technological advances, etc., other controller arrangements such as, for example, using the controller system to control other vehicle functions (trunk lock, gas cap lock, kill engine), etc., may suffice.

Remote vehicle-unlocking unit 300 preferably utilizes a sequence of four customer-selected DTMF tones. Applicant has determined that the use of a minimum of four coded tones makes the probability of accidental "unlocking" nearby system-equipped vehicles statistically unlikely. It is further noted that remote vehicle-unlocking unit 300, as described, may preferably comprise codes of more than four digits. Upon reading this specification, those with ordinary skill in the art will now appreciate that, under appropriate circumstances, considering such issues as cost, user preference, etc., other coded transmission arrangements such as, for example, using a radio frequency (RF) transmitter to remotely control other devices internal to a vehicle capable of unlocking a power locked vehicle entry point (e.g., a receiver module in the fuse box or in the lock power wire that is capable of unlocking the vehicle), using a blue tooth device or Wi-Fi device to transmit a unique RF signal to unlock a vehicle entry point, using a manually-generated audible sound (e.g., knocking on a window with a particular knock pattern), etc., may suffice. Furthermore, upon reading this specification, those with ordinary skill in the art will now appreciate that, under appropriate circumstances, considering such issues as cost, user preference, etc., other unlocking environments such as, for example, adapting systems to work with an electronic lock system for a home, an electronic lock system for a safe, an electronic lock system for a bank, etc., may suffice.

Control circuit 153 is preferably powered by the battery 130 of vehicle 213 via the power and ground pins of DLC 206. The direct current (DC) voltage supplied to control circuit 153 from DLC 206 is preferably processed by one or more on-board voltage-regulation circuits 205 structured and arranged to provide appropriate system voltages, reference voltages, etc. As each particular bus interface requires particular voltage levels, a 3-volt regulator and an 8-volt regulator are preferably provided within control circuit 153. Upon reading this specification, those with ordinary skill in the art will now appreciate that, under appropriate circumstances, considering such issues as cost, user preference, etc., other power arrangements such as, for example, providing an on-board battery, etc., may suffice.

Control circuit 153 is preferably constructed using one or more printed circuit boards (PCB) used to mechanically support and electrically connect the above-described electronic components of control circuit 153. The physical dimensions of the PCB are preferably compact to facilitate the installation of control circuit 153 within a small-format outer housing 119, as shown in FIG. 9 through FIG. 13.

FIG. 9 shows a side view illustrating preferred outer packaging arrangements of remote vehicle-unlocking unit 300, according to the preferred embodiment of FIG. 1. FIG. 10 shows a first end view illustrating preferred outer packaging arrangements of remote vehicle-unlocking unit 300. FIG. 11 shows a second end view illustrating preferred outer packaging arrangements of remote vehicle-unlocking unit 300. FIG. 12 shows a bottom view illustrating preferred outer packaging arrangements of remote vehicle-unlocking unit 300. FIG. 13 shows a top view illustrating preferred outer packaging arrangements of remote vehicle-unlocking unit 300. The upper surface of outer housing 119 preferably comprises test/reset button 184 and at least one status indicator 186, as shown.

Remote vehicle-unlocking unit 300 preferably comprises a single housing 119 (at least embodying herein at least one housing structured and arranged to house such at least one digital controller; and, at least embodying herein housing means for housing such digital control means), preferably made from tough, flexible, resistant-to-fatigue, resistant-to-heat and cost-effective-to-manufacture material, preferably at least one rugged plastic, preferably polypropylene.

Figure 14:
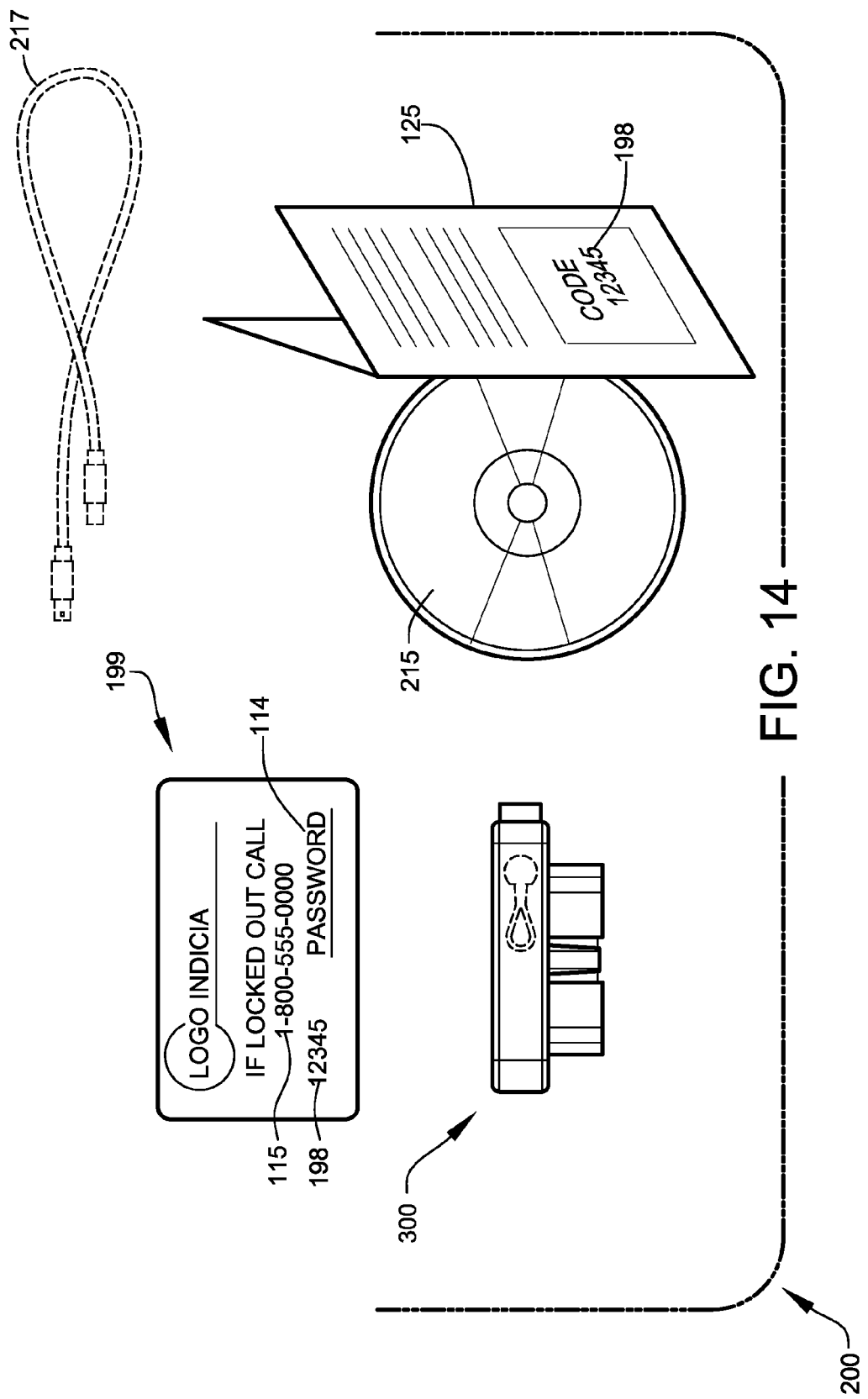
FIG. 14 shows a perspective view, illustrating a vehicle unlocking kit, according another preferred embodiment of the present invention.

FIG. 14 shows a perspective view, illustrating vehicle unlocking kit 200, according a preferred embodiment of the present invention. Vehicle unlocking kit 200 preferably comprises at least one set of kit instructions 125, at least one wallet-sized card 199, and at least one remote vehicle-unlocking unit 300 (as described above).

Kit instructions 125 preferably comprises instructions for installation and programming of remote vehicle-unlocking unit 300, preferably at least a printed set of instructions for use and service of remote vehicle-unlocking unit 300. More preferably, kit instructions 125 preferably comprise at least one form of digital media 215 containing installation instructions and instructions for use preferably including at least one program adapted to interoperate with a personal computer (PC) or laptop to allow user 110 to program remote vehicle-unlocking unit 300 with a user-selected code and specific OBD-II vehicle information.

As there are many combinations of interface protocols, computer vehicle unlock codes, and voltage standards within the preferred vehicle range, user 110 preferably programs remote vehicle-unlocking unit 300 using the software provided within the kit. A user may preferably be directed Internet web site 168 to download the latest specific information for their vehicle. Preferably, any default or pre-programmed codes are preferably indicated to user 110 when vehicle unlocking system-kit 200, as shown in FIG. 14, is initially purchased, and installed.

Preferred embodiments of vehicle unlocking kit 200 preferably comprise at least one data-transfer cable 217, preferably a USB cable to allow user 110 to establish a data link between computer 178 and user data port 176 of remote vehicle-unlocking unit 300. Upon reading this specification, those with ordinary skill in the art will now appreciate that, under appropriate circumstances, considering such issues as reduction in cost, advances in technology, etc., other data communication arrangements such as, for example, wireless data transfer, etc., may suffice.

A user 110 who has purchased vehicle unlocking kit 200 for use without a service is preferably supplied with a wallet-sized card 199 that preferably includes a location for recording the user's selected PIN 148. Upon reading this specification, those with ordinary skill in the art will now appreciate that, under appropriate circumstances, considering such issues as cost, user preference, etc., other arrangements such as, for example, including a phone number or web address to assist a user retrieve a lost or forgotten PIN, etc., may suffice.

A user 110 who has preferably purchased vehicle unlocking kit 200 for use with service 166 (see FIG. 2) is preferably given a wallet-sized card 199 that preferably includes at least one emergency number 115. Preferably, wallet-sized card 199 bears at least one logo on the front-face, allowing user 110 to quickly distinguish it from other credit cards. Preferably, a product ID number 198 will also appear on front-face.

Wallet-sized card 199 preferably about 2⅛ inches by about 3⅜ inches (a standard credit-card size) to allow for ease of fit in a standard wallet of user 110. Wallet-sized card 199 preferably identifies a product-support website address to obtain any product and service information that applies to commercial embodiments of vehicle unlocking system 100. Preferably, user 110 will keep wallet-sized card 199 in a wallet, purse or on her person at all times, so emergency number 115 is available should she be locked out of vehicle 213.

Kit instructions 125 may preferably include directions for using service 166. This may preferably include the use of a pre-determined password, more preferably instructions for subscribing to the service and recording/registering a user-selected password 114 through a toll-free number or Internet website 168.

Kit instructions 125 is preferably a technically written document with images used to fully explain preferred installation and programming procedures. Preferably, at least one toll-free number 116 and at least one website address are included for user assistance during and after installation.

Service instructions are preferably included for maintenance procedures and trouble-shooting of remote vehicle-unlocking unit 300, to ensure reliability, ease of use by user 110 and longevity of the system. Preferably, at least one set of warranty terms for components of vehicle unlocking system 100 and at least one set of part numbers are preferably set out in kit instruction 125 for reference by user 110.

Referring again to FIG. 1 through FIG. 14, with specific reference to FIG. 2, the above described arrangement at least embodies herein a method 350 relating to assisting unlocking entry to at least one vehicle 213 having at least one digitally-controlled vehicle unlocking system (power-lock system 207), comprising the steps of: providing at least one digital controller (remote vehicle-unlocking unit 300) adapted to digitally control such digitally-controlled vehicle unlocking system, and at least one housing structured and arranged to house such at least one digital controller, wherein such at least one housing comprises at least one attacher to attach such at least one housing with the at least one vehicle, wherein such at least one digital controller comprises at least one coupler to digitally couple such at least one digital controller to the at least one digitally-controlled vehicle unlocking system, and wherein such at least one digital controller comprises at least one computer structured and arranged to recognize at least one sequence of acoustic signals, generate at least one digital control signal on recognition of such at least one sequence of acoustic signals, and transmit such at least one digital control signal to the at least one digitally-controlled vehicle unlocking system using such at least one coupler; and wherein such at least one digital control signal is adapted to interact with the at least one digitally-controlled vehicle unlock system to assist unlocking of the at least one vehicle; providing for user setting at least one specific coded series of acoustic signals to be so recognized; and providing at least one monetized service for at least one customer wishing remote assistance at times when such customers vehicle is locked and such customer does not have possession of the key; wherein such at least one monetized service comprises the steps of providing at least one call center 145 reachable by at least one mobile phone 150 by such at least one customer, and providing at least one method by which such at least one call center 145 can verify the identity of such at least one customer, and upon such verifying, providing for signaling such at least one mobile phone in such manner that such at least one mobile phone emits such at least one specific coded series of acoustic signals; wherein such at least one customer is enabled to expose such locked vehicle to such at least one specific coded series of acoustic signals; and wherein such locked vehicle may be assisted to be unlocked.

Furthermore, it provides such a method wherein such at least one specific coded series of acoustic signals comprises at least a 4-digit alpha numeric code adapted to identify a specific digital controller. Further, it provides such a method further comprising the step of providing such at least one monetized service comprising a monthly service fee in exchange for such service, as best described in FIG. 2.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method for using a vehicle unlocking system to unlock entry to a vehicle, comprising the steps of:
    using at least one controller to control said vehicle unlocking system;
    using a housing to house said at least one digital controller, wherein said at least one housing comprises at least one attacher, said attacher mechanically configured to attach said at least one housing to the vehicle; and
    coupling said at least one digital controller to the vehicle using a coupler of said unlocking system,
        wherein said at least one digital controller comprises at least one computer configured to:
            (1) recognize at least one sequence of acoustic signals, (2) generate at least one digital control signal on recognition of the acoustic signals, and
(3) transmit the at least one digital control signal to the vehicle unlocking system using said coupler, and
wherein the at least one digital control signal is configured to assist unlocking of the vehicle, and
wherein the sequence of acoustic signals comprises at least a four-digit alpha numeric code adapted to identify a specific digital controller.

2. The method of claim 1, further comprising the step of: retaining said housing proximate a diagnostic port of the vehicle using a tether, said tether comprising an element of said attacher.

3. A kit, relating to assisting unlocking entry to at least one vehicle having at least one digitally-controlled vehicle unlocking system, comprising:
   a) at least one digital controller adapted to digitally control such digitally-controlled vehicle unlocking system, wherein such at least one digital controller comprises
      i) at least one acoustic detector structured and arranged to detect at least one sequence of acoustic signals generated by at least one cell phone,
      ii) at least one control signal generator configured to generate at least digital control signal on direct detection, by a microphone of said unlocking system, of the at least one sequence of acoustic signals output by said cell phone,
      iii) at least one coupler to digitally couple said at least one digital controller to the at least one digitally-controlled vehicle unlocking system,
      iv) at least one control-signal transmitter to transmit the at least digital control signal to the at least one digitally-controlled vehicle unlocking system, wherein such at least one digital control signal is adapted to interact with the at least one digitally-controlled vehicle unlock system to assist unlocking of the at least one vehicle; and
   b) at least one set of instructions for installation and use of the vehicle unlocking system,
wherein said at least one set of instructions comprises at least one digital format, and
wherein said at least one set of instructions comprises at least one computer-hardware-executable program structured and arranged to assist user programming of such at least one digital controller with user-specific data.

4. The kit of claim 3, further comprising at least one wallet-sized instruction card.

5. A protection system, relating to protectively capping at least one onboard electronic diagnostic port of at least one vehicle having at least one onboard electronic diagnostic subsystem digitally coupled to at least one digitally-controlled vehicle unlocking system, comprising:
   a) at least one protective cap structured and arranged to protectively cap the at least one onboard electronic diagnostic port;
   b) wherein at least one protective cap comprises
      i) at least one digital controller adapted to digitally control such digitally-controlled vehicle unlocking system, and
      ii) at least one attacher to attach said at least one protective cap to the at least one onboard electronic diagnostic port;
   c) wherein said at least one attacher comprises at least one coupler to digitally couple said at least one digital controller to the at least one onboard electronic diagnostic port;
   d) wherein said at least one digital controller comprises at least one computer structured and arranged to
      i) recognize at least one sequence of acoustic signals,
      ii) generate at least one digital control signal on recognition of such at least one sequence of acoustic signals, and
      iii) transmit such at least one digital control signal to the at least one digitally-controlled vehicle unlocking system using the at least one onboard electronic diagnostic port; and
      iv) wherein such at least one digital control signal is adapted to interact with the at least one digitally-controlled vehicle unlock system to assist unlocking of the at least one vehicle.

* * * * *